(12) United States Patent
Langford-Wood (10) Patent No.: US 10,025,312 B2
(45) Date of Patent: Jul. 17, 2018

(54) MULTIPLE AUTOPILOT INTERFACE

(71) Applicant: Navico Holding AS, Egersund (NO)

(72) Inventor: Robert Langford-Wood, Southampton (GB)

(73) Assignee: NAVICO HOLDING AS, Egersund (NO)

( * ) Notice: Subject to any disclaimer, the term of this patent is extended or adjusted under 35 U.S.C. 154(b) by 49 days.

(21) Appl. No.: 14/628,165

(22) Filed: Feb. 20, 2015

(65) Prior Publication Data

US 2016/0246300 A1     Aug. 25, 2016

(51) Int. Cl.
*G05D 1/00* (2006.01)
*G05D 1/02* (2006.01)
*B63B 49/00* (2006.01)

(52) U.S. Cl.
CPC ............ *G05D 1/0206* (2013.01); *B63B 49/00* (2013.01)

(58) Field of Classification Search
CPC ............................... B63B 49/00; G05D 1/0206
See application file for complete search history.

(56) References Cited

U.S. PATENT DOCUMENTS

| | | |
|---|---|---|
| 1,982,702 A | 12/1934 | Sperry, Jr. |
| 5,034,895 A | 7/1991 | Johnson et al. |
| 5,172,324 A | 12/1992 | Knight |
| 5,202,835 A | 4/1993 | Knight |
| 5,362,263 A * | 11/1994 | Petty ............... B63H 25/04 114/144 E |
| 5,491,636 A | 2/1996 | Robertson et al. |
| 5,509,369 A | 4/1996 | Ford et al. |
| 5,523,951 A | 6/1996 | Kriesgman et al. |
| 5,632,217 A | 5/1997 | Ford et al. |
| 5,785,281 A | 7/1998 | Peter et al. |
| 5,809,457 A | 9/1998 | Yee et al. |
| 6,230,642 B1 | 5/2001 | McKenney et al. |
| 6,273,771 B1 | 8/2001 | Buckley et al. |
| 6,311,634 B1 | 11/2001 | Ford et al. |
| 6,431,923 B1 | 8/2002 | Knight et al. |
| 6,459,372 B1 | 10/2002 | Branham et al. |
| 6,611,737 B1 * | 8/2003 | El-Tahan ............. G05D 1/0206 701/21 |
| 6,687,579 B2 | 2/2004 | Thompson et al. |
| 6,696,980 B1 | 2/2004 | Langner et al. |
| 6,803,860 B1 | 10/2004 | Langner et al. |

(Continued)

FOREIGN PATENT DOCUMENTS

| | | |
|---|---|---|
| GB | 2424967 B | 2/2008 |
| KR | 20140016782 A | 2/2014 |
| KR | 101383293 B1 | 4/2014 |

*Primary Examiner* — Jess Whittington
(74) *Attorney, Agent, or Firm* — Nelson Mullins Riley & Scarborough LLP (57) ABSTRACT

Various implementations described herein are directed to a non-transitory computer readable medium having stored thereon computer-executable instructions which, when executed by a computer, may cause the computer to display buttons or icons corresponding to a plurality of autopilots. The computer may receive a selection of one of the autopilots. The computer may display autopilot commands corresponding to the selected autopilot. The computer may receive a selection of one of the commands. The computer may also transmit a message corresponding to the selected command to the selected autopilot.

16 Claims, 7 Drawing Sheets

(56) References Cited

U.S. PATENT DOCUMENTS

| | | |
|---|---|---|
| 6,832,138 B1 | 12/2004 | Straub et al. |
| 6,842,122 B1 | 1/2005 | Langner et al. |
| 6,867,711 B1 | 3/2005 | Langner et al. |
| 6,909,946 B1* | 6/2005 | Kabel ................. H04W 84/005 340/984 |
| 6,946,976 B1 | 9/2005 | Langner et al. |
| 7,004,803 B2 | 2/2006 | Ruffe |
| 7,127,333 B2 | 10/2006 | Arvidsson |
| 7,200,488 B2 | 4/2007 | Taboada |
| 7,254,483 B2 | 8/2007 | Squires et al. |
| 7,404,369 B2 | 7/2008 | Tracht et al. |
| 7,769,932 B2 | 8/2010 | Nichols |
| 8,156,882 B2 | 4/2012 | Ito |
| 8,180,503 B2 | 5/2012 | Estabrook et al. |
| 8,195,346 B1 | 6/2012 | Duerksen et al. |
| 8,209,069 B1 | 6/2012 | McLoughlin et al. |
| 8,265,812 B2 | 9/2012 | Pease |
| 8,346,395 B2 | 1/2013 | Rosen et al. |
| 8,589,027 B2 | 11/2013 | Hosokawa |
| 8,626,365 B2 | 1/2014 | Shimo et al. |
| 8,731,748 B2 | 5/2014 | Haymart et al. |
| 8,761,976 B2 | 6/2014 | Salmon et al. |
| 8,992,274 B1 | 3/2015 | Ward et al. |
| 9,039,468 B1 | 5/2015 | Arbuckle et al. |
| 9,248,898 B1 | 2/2016 | Kirchhoff et al. |
| 9,359,057 B1 | 6/2016 | Andrasko et al. |
| 9,377,780 B1 | 6/2016 | Arbuckle et al. |
| 2003/0028294 A1 | 2/2003 | Yanagi |
| 2003/0045975 A1 | 3/2003 | Thompson et al. |
| 2004/0181322 A1 | 8/2004 | Okuyama |
| 2005/0252764 A1 | 11/2005 | Meller |
| 2005/0263058 A1 | 12/2005 | Suemori et al. |
| 2006/0089794 A1 | 4/2006 | DePasqua |
| 2006/0293806 A1 | 12/2006 | Basilico |
| 2007/0143090 A1* | 6/2007 | Skjetne ................. B63H 23/24 703/18 |
| 2007/0162207 A1 | 7/2007 | Shimo et al. |
| 2007/0178779 A1* | 8/2007 | Takada ................... B63H 5/125 440/61 S |
| 2007/0244639 A1* | 10/2007 | Butterworth ........... B63H 25/02 701/431 |
| 2008/0003898 A1 | 1/2008 | Watanabe et al. |
| 2008/0039988 A1 | 2/2008 | Estabrook et al. |
| 2008/0169779 A1 | 7/2008 | Samek |
| 2008/0205191 A1 | 8/2008 | Coste et al. |
| 2009/0037040 A1* | 2/2009 | Salmon ................... B63B 17/00 701/21 |
| 2011/0169684 A1 | 7/2011 | Margolin |
| 2011/0213515 A1* | 9/2011 | Haymart ................ G01C 21/00 701/21 |
| 2012/0014220 A1 | 1/2012 | DePasqua |
| 2012/0015566 A1* | 1/2012 | Salmon ................... B63H 21/21 440/1 |
| 2012/0130570 A1 | 5/2012 | Pease |
| 2012/0232719 A1* | 9/2012 | Salmon ................ G05D 1/0206 701/2 |
| 2013/0085630 A1 | 4/2013 | Ninomiya et al. |
| 2013/0110329 A1 | 5/2013 | Kinoshita et al. |
| 2014/0340241 A1 | 11/2014 | Smart, Jr. |
| 2015/0035772 A1* | 2/2015 | Asahara ................. B63B 49/00 345/173 |
| 2015/0054732 A1 | 2/2015 | Bailey |
| 2015/0089427 A1* | 3/2015 | Akuzawa ............. G05D 1/0206 715/771 |
| 2015/0261379 A1* | 9/2015 | Kneuper ............. G08G 5/0052 345/173 |
| 2016/0016651 A1* | 1/2016 | Anderson ............. B63H 25/04 701/2 |
| 2016/0121989 A1* | 5/2016 | Okuda ................... B63H 25/02 701/2 |

\* cited by examiner

MULTIPLE AUTOPILOT INTERFACE

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A watercraft, i.e., a marine vessel, may have one or more motors that are used for propulsion or steering. Typically, the engines are gasoline, electric, or diesel engines. The motors may be operated manually or by autopilot units. An autopilot unit may control the direction and speed of the motor.

SUMMARY

Described herein are implementations of various technologies for a non-transitory computer-readable medium having stored thereon computer-executable instructions which, when executed by a computer, cause the computer to perform various actions. The actions may include displaying buttons or icons corresponding to a plurality of autopilots. The actions may include receiving a selection of one of the autopilots. The actions may include displaying autopilot commands corresponding to the selected autopilot. The actions may include receiving a selection of one of the commands. The actions may also include transmitting a message corresponding to the selected command to the selected autopilot.

Described herein are also implementations of various technologies for an apparatus for displaying marine electronic data. The device includes one or more processors, a screen configured to display marine data, and a memory. The memory has a plurality of executable instructions. When the executable instructions are executed by the one or more processors, the processors may display buttons or icons corresponding to a plurality of autopilots. The processors may receive a selection of one of the autopilots. The processors may display autopilot commands corresponding to the selected autopilot. The processors may receive a selection of one of the commands. The processors may also transmit a message corresponding to the selected command to the selected autopilot.

Described herein are also implementations of various technologies for a non-transitory computer-readable medium having stored thereon computer-executable instructions which, when executed by a computer, cause the computer to perform various actions. The actions may include receiving a selection of a first autopilot from a plurality of autopilots. The actions may include receiving a command for the first autopilot. The actions may include transmitting a first message to a second autopilot. The first message includes instructions to deactivate the second autopilot. The actions may also include transmitting a second message corresponding to the command to the first autopilot.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations described herein will now be described in more detail with reference to FIGS. 1-8.

Figure 1:
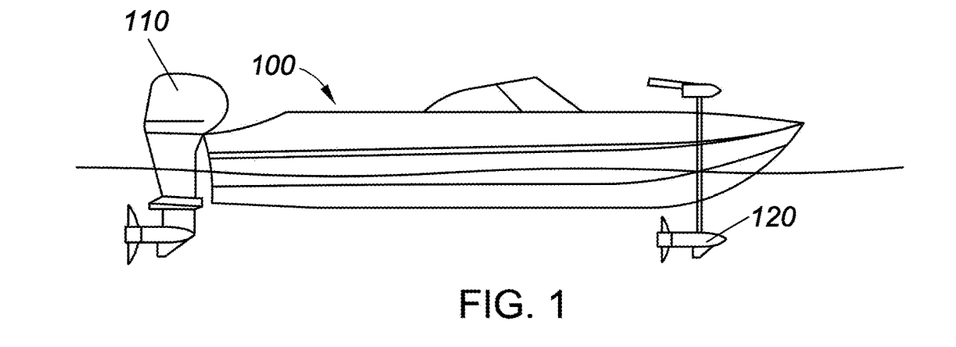
FIG. 1 illustrates a watercraft in connection with various implementations described herein.

FIG. 1 illustrates a watercraft 100 in connection with various implementations described herein. The watercraft 100 has a gasoline/diesel outboard motor 110. The watercraft 100 may use one or more outboard motors, inboard motors, thrusters, jets, pods, trolling motors, or any other type of watercraft motor for propulsion. The watercraft 100 also has a trolling motor 120. The trolling motor 120 may be used for directional control and localized propulsion. The trolling motor 120 may be a gasoline, diesel, or electric motor. The trolling motor 120 may be quieter than the outboard motor 110. The trolling motor 120 may be used to propel and steer the watercraft 100 while a fisherman is fishing. The trolling motor 120 may be attached to either the bow or the stern of the watercraft 100. The trolling motor 120 may be raised out of the water when not in operation. For example, the trolling motor 120 may be raised while the outboard motor 110 is being operated in order to reduce drag on the watercraft 100.

Figure 2:
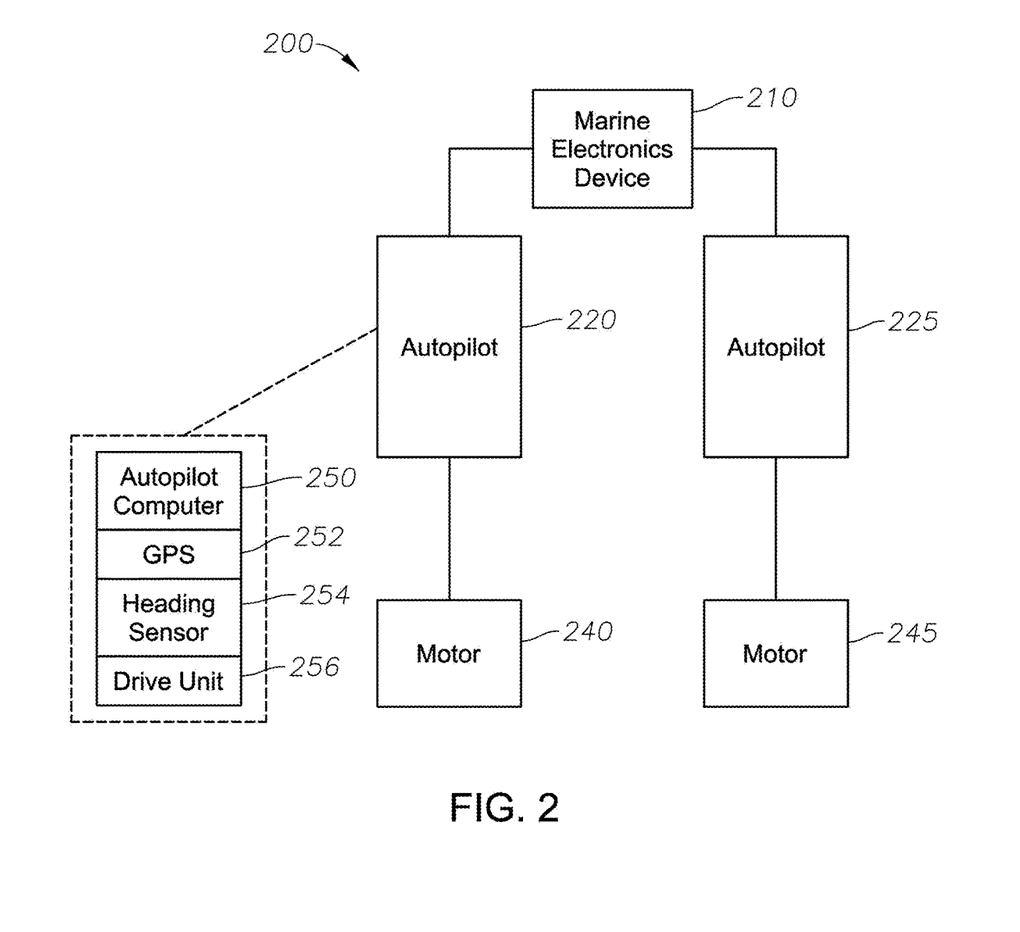
FIG. 2 illustrates a block diagram of a watercraft with multiple autopilots in accordance with various implementations described herein.

FIG. 2 illustrates a block diagram 200 of a watercraft with multiple autopilots in accordance with various implementations described herein. A marine electronics device 210, further described in FIG. 8, may be attached to or integrated in a watercraft. The marine electronics device 210 may be connected to electronic systems on the watercraft 100. The marine electronics device 210 may be used to display marine data or control systems on the watercraft. For example, the marine electronics device 210 may be used to display a speed, location, or heading of a watercraft. In another example, the marine electronics device 210 may be used to control the audio system or one or more motors on the watercraft.

The marine electronics device 210 may be connected to a first autopilot 220, which is configured to control the operation of a motor 240. The marine electronics device 210 may also be connected to a second autopilot 225, which is configured to control the operation of a motor 245. In one implementation, the first motor may be an outboard motor and the second motor may be a trolling motor. The autopilots 220 and 225 may be individual units, or they may be integrated in the marine electronics device 210 or a motor.

For example, a trolling autopilot may be integrated within a trolling motor. The autopilots 220 and 225 may be used to steer a watercraft to a heading, navigate to a waypoint or along a route, maintain a bearing, maintain a position, or perform turn patterns.

The autopilots 220 and 225 may comprise an autopilot computer 250, a Global Positioning System (GPS) unit 252, a heading sensor 254, and a motor drive unit 256. The autopilot computer 250 may be a steering or course computer, which in response to sensory input, calculates the required steering movement and motor speed control such that the watercraft 100 can automatically maintain a selected or calculated heading and speed.

The GPS unit 252 may provide the autopilot computer 250 with location or a clock. For example, the latitude and longitude of a watercraft may be determined using the GPS unit 252. The heading sensor 254 may provide the autopilot computer 250 with the watercraft's 100 bearing. For example, the heading sensor 254 may be a compass. In one implementation, the GPS unit 252 or heading sensor 254 is integrated within the autopilot 220 or 225. In one implementation, the GPS unit is attached to a network, and the autopilot 220 and 225 retrieves the GPS data from the network. The autopilots 220 and 225 may receive data from other sensors, e.g., sensor data that indicates the position of a rudder or the orientation of a motor. The motor drive unit 256 in the autopilots 220 and 225 may be used to control or steer the motors 240 and 245. For example, the motor drive unit 256 may control a tiller on a watercraft. In one implementation, the motor drive unit 256 may be a hydraulic system or a cable steer system.

Figure 3:
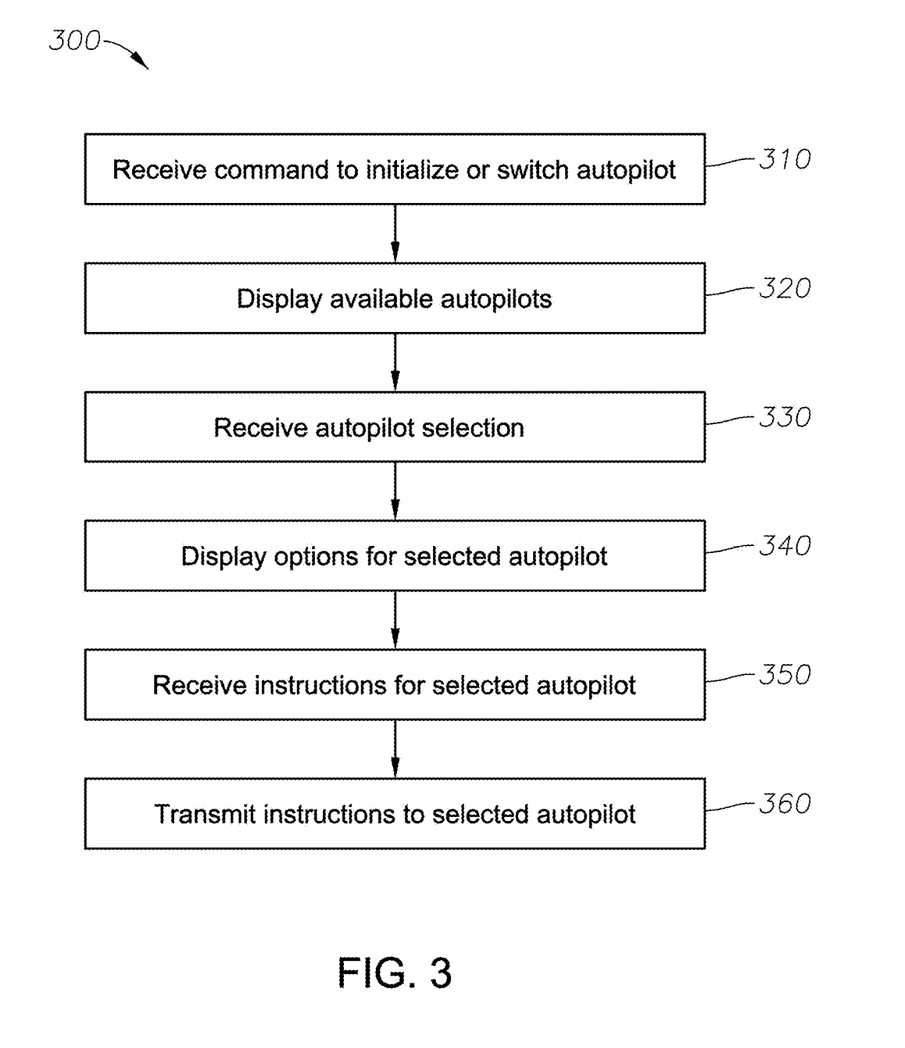
FIG. 3 is a flow diagram of a method for switching between multiple autopilots in accordance with various implementations described herein.
Figure 7:
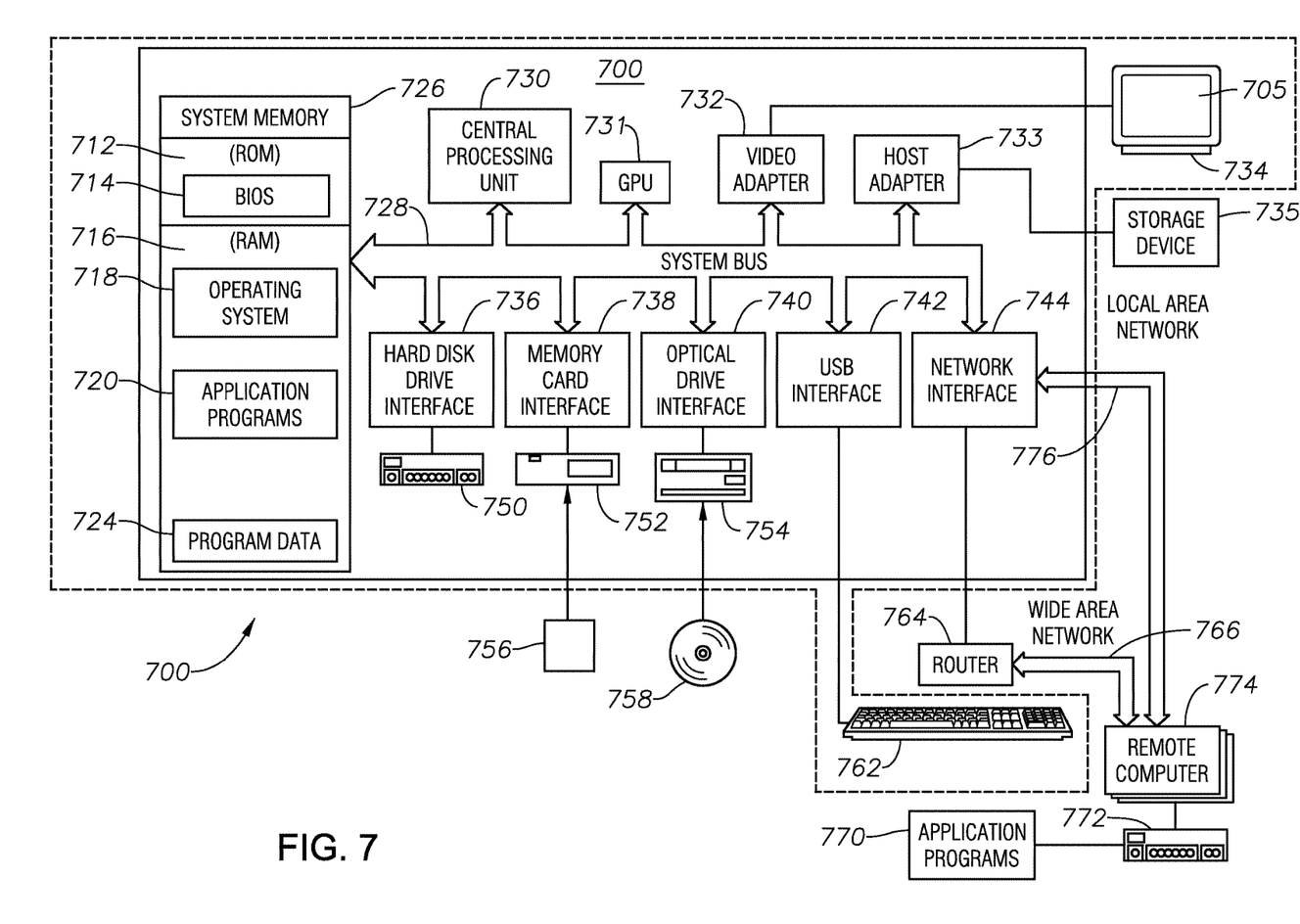
FIG. 7 illustrates a schematic diagram of a computing system in which the various technologies described herein may be incorporated and practiced.
Figure 8:
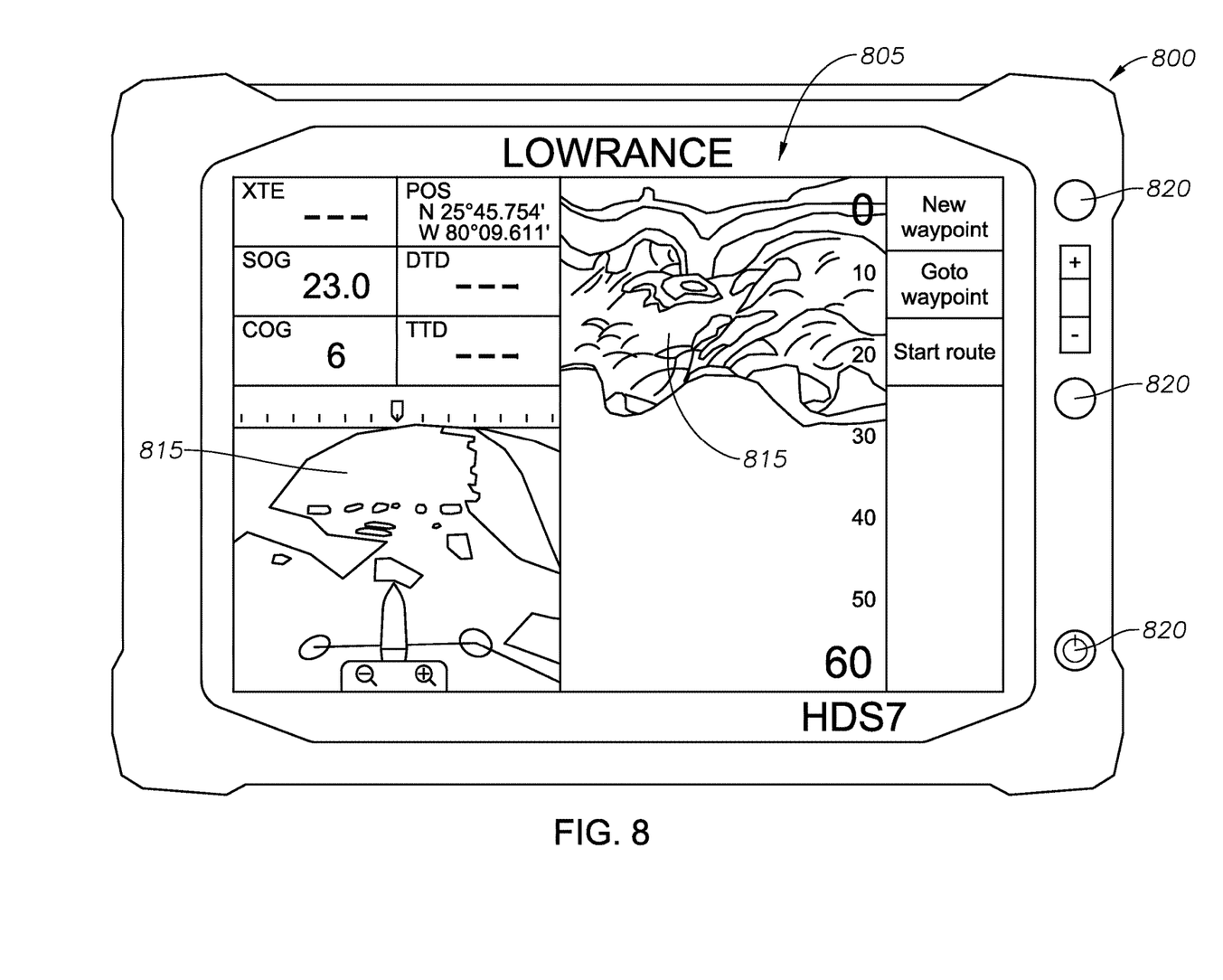
FIG. 8 illustrates a schematic of a marine electronics device in accordance with various implementations described herein.

FIG. 3 is a flow diagram of a method 300 for switching between multiple autopilots in accordance with various implementations described herein. In one implementation, method 300 may be performed by any computer system 700, including a marine electronics device 800 and the like. It should be understood that while method 300 indicates a particular order of execution of operations, in some implementations, certain portions of the operations might be executed in a different order, and on different systems. Further, in some implementations, additional operations or steps may be added to the method 300. Likewise, some operations or steps may be omitted.

At block 310, a marine electronics device receives a command to initialize an autopilot or switch autopilots.

Figure 4:
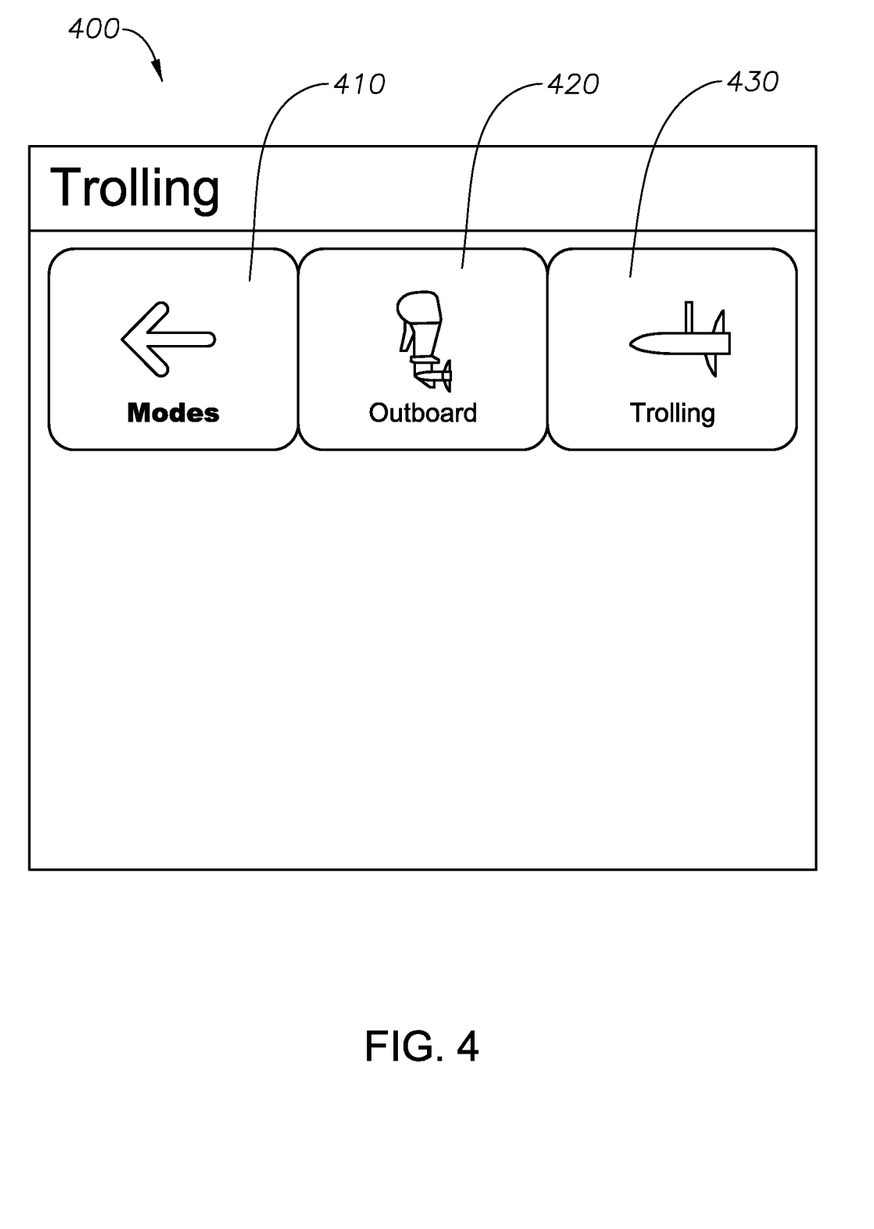
FIG. 4 illustrates a user interface for multiple autopilots in accordance with various implementations described herein.

At block 320, the marine electronics device may display a plurality of available autopilots that are capable of or configured to receive messages, or commands, from the marine electronics device. The display may allow a user to select one of the displayed autopilots. FIG. 4 illustrates an example of a display with multiple autopilots. The available autopilots may be represented by an icon or symbol. In one implementation, the display may have a button for a trolling motor autopilot and a button for an outboard motor autopilot. Any number of autopilots may be displayed at block 320. For example, if a watercraft has a trolling motor autopilot and two outboard motor autopilots, then three autopilots may be displayed at block 320.

At block 330, the marine electronics device may receive an autopilot selection entered by a user. In one implementation, the user may press a button on a touchscreen to enter the autopilot selection. For example, if a user wants to control a trolling motor autopilot, the user may press a button corresponding to the trolling motor.

Figure 5:
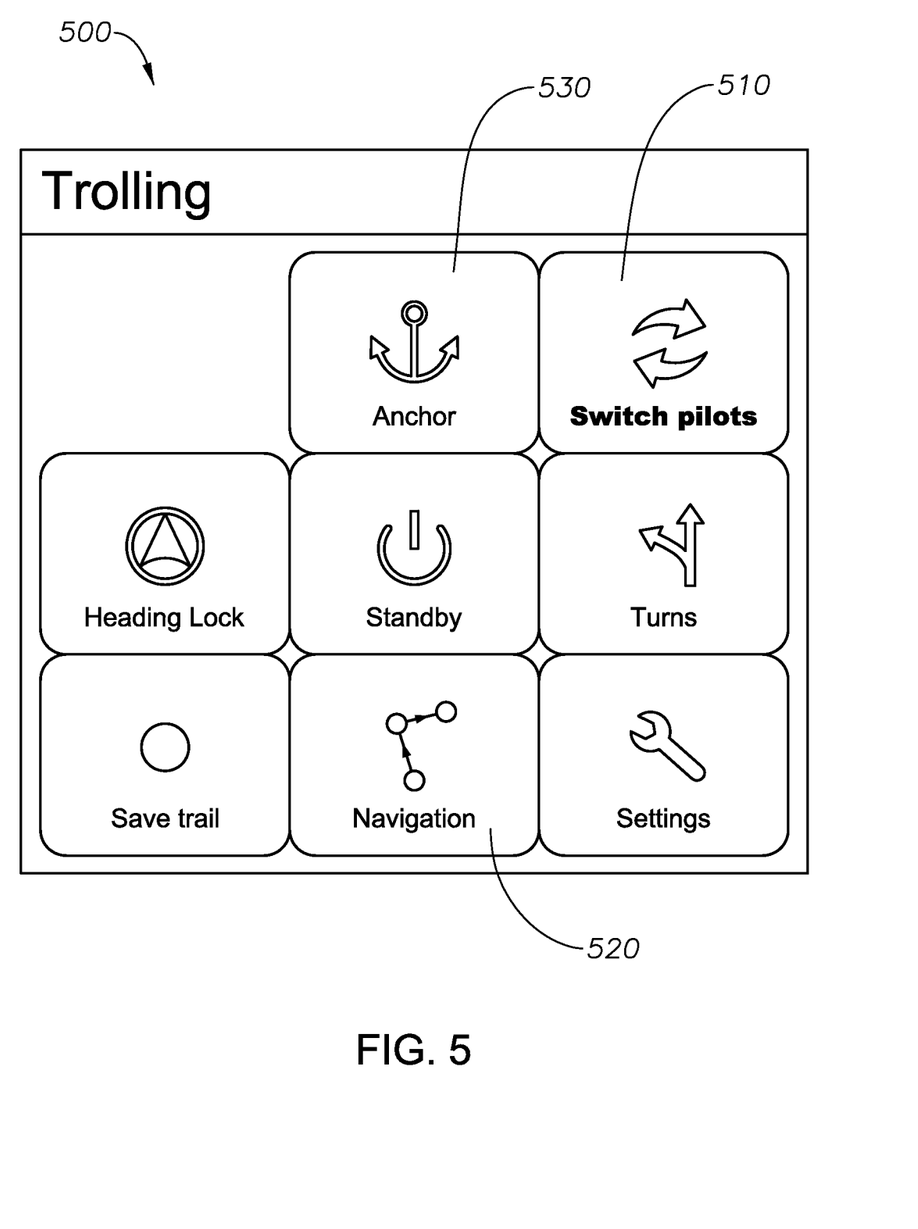
FIG. 5 illustrates a trolling autopilot interface in accordance with various implementations described herein.
Figure 6:
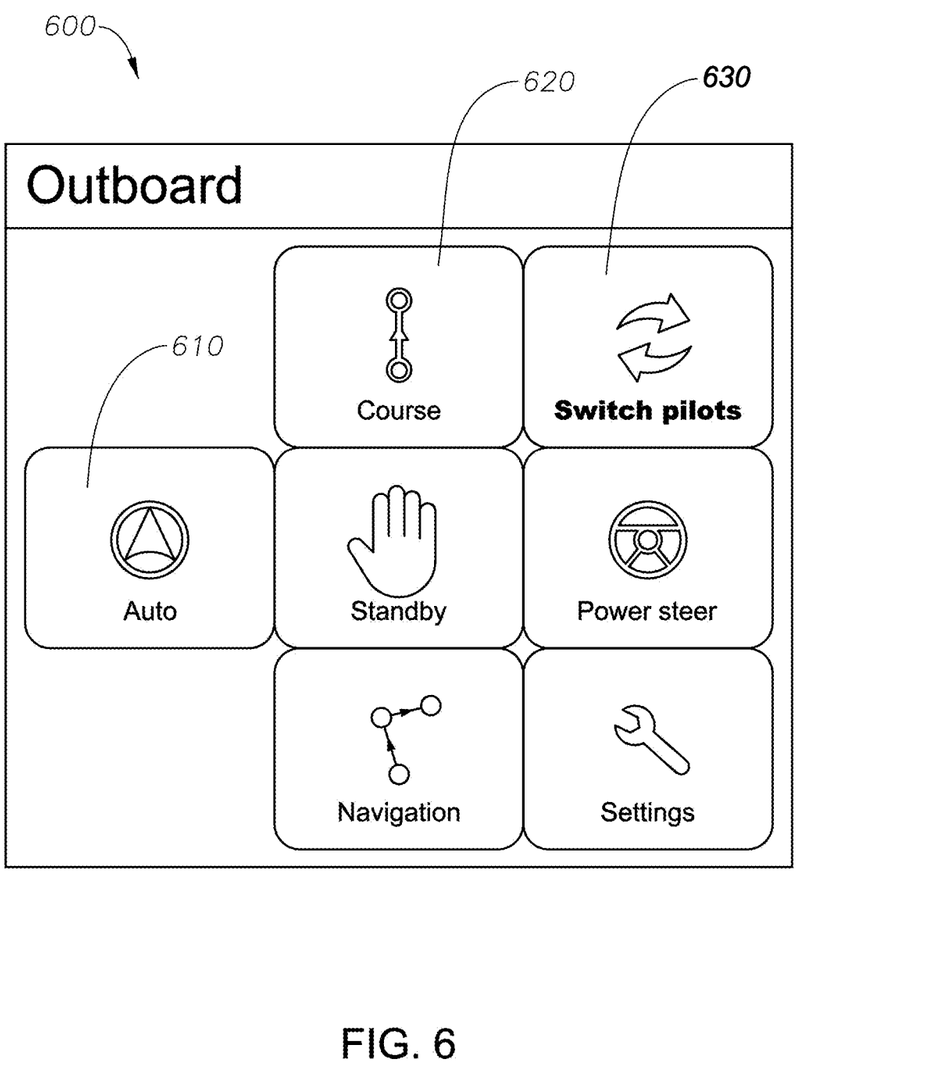
FIG. 6 illustrates an outboard autopilot interface in accordance with various implementations described herein.

At block 340, the marine electronics device may display a user interface with menu options for the selected autopilot. FIGS. 5 and 6 illustrate examples of interfaces with options for an autopilot. The menu options may include autopilot modes, or commands that may be issued, or transmitted, to an autopilot. For example, an option may allow a user to issue a command to the autopilot to navigate to a location or a series of locations. In another example, an option may allow a user to alter the heading of a vessel.

At block 350, the marine electronics device may receive instructions for the selected autopilot. For example, the received instructions may be one or more locations or waypoints for the autopilot to navigate to. In another example, the received instructions may be instructions to change a heading or speed.

At block 360, the marine electronics device may transmit the instructions received at block 350 to the autopilot selected at block 330. The instructions may be transmitted using a wired or wireless connection or network. The instructions may be converted into a format compatible with the selected autopilot. The instructions may comprise a single instruction or multiple instructions. The instructions may be transmitted as a message. The instructions may be transmitted at a single time or at multiple times. In one implementation, the instructions may be transmitted at a designated location or time, or based on a heading of the watercraft. For example, if the instructions received at block 350 are a series of waypoints, a first waypoint may be transmitted to the autopilot, and after the watercraft reaches the first waypoint, a second waypoint may be transmitted to the selected autopilot. In another example, if a heading is selected for the watercraft, and the watercraft deviates from the selected heading, instructions may be transmitted to the autopilot to correct the heading.

The instructions transmitted to the autopilot at block 360 may be determined based on data received from one or more sensors. For example, if a user selects a heading, and a heading sensor indicates that the watercraft is already traveling on that heading, then no instructions may be transmitted. In this example, if the heading sensor indicates that the watercraft is not on the selected heading, then instructions may be transmitted to alter the watercraft's heading.

At block 360, the marine electronics device may transmit instructions to deactivate an autopilot that was not selected at block 330. For example, if a trolling motor autopilot is active, and a user selects an outboard motor autopilot at block 330 and selects instructions for the outboard motor autopilot at block 350, the marine electronics device may transmit a command at block 360 to the trolling motor autopilot to deactivate the trolling motor autopilot.

FIG. 4 illustrates a user interface 400 for multiple autopilots in accordance with various implementations described herein. The interface 400 may be displayed on a marine electronics device, further described in FIG. 8. The interface 400 may be used to select an autopilot. FIG. 3 describes an example of a method that may be used to display interface 400 in order to select an autopilot. Interface 400 includes a button 420 corresponding to an outboard motor autopilot and a button 430 corresponding to a trolling motor autopilot. The interface 400 also includes a button 410, which may be used to display another menu. Although the interface 400 includes selections for an outboard autopilot and a trolling autopilot, any type of autopilot may be displayed and selected using interface 400. Additionally, any number of autopilots may be displayed using interface 400.

As described in FIG. 3, at blocks 320-340, a user may make an autopilot selection using interface 400. After making the selection, an autopilot control interface corresponding to the selection may be displayed. FIGS. 5 and 6 illustrate examples of autopilot control interfaces.

FIG. 5 illustrates a trolling autopilot interface 500 in accordance with various implementations described herein. The interface 500 includes various buttons for selecting commands or instructions that may be transmitted to an autopilot. The interface 500 illustrates an example of autopilot control modes that may be displayed, but other autopilot modes may be displayed in addition to or in lieu of the illustrated control modes.

The interface 500 includes a 'Navigation' menu option 520. If a user selects the 'Navigation' option 520, the user may select or enter a desired location, coordinates, or waypoint for a trolling motor autopilot to navigate to. The interface 500 also includes an 'Anchor' menu option 530. If a user selects the 'Anchor' menu option 530, a trolling motor autopilot may be instructed to maintain a current position of a watercraft. The interface 500 also includes a 'Switch pilots' menu option 510. The 'Switch pilots' menu option 510 may be selected to deactivate a currently active autopilot, and activate another autopilot. For example, after the option 510 is selected, interface 400 in FIG. 4 may be displayed and a user may select an autopilot to activate.

FIG. 6 illustrates an outboard autopilot interface 600 in accordance with various implementations described herein. The interface 600 includes various buttons for selecting commands or instructions that may be transmitted to an autopilot. The interface 600 illustrates an example of autopilot control modes that may be displayed, but other autopilot modes may be displayed in addition or in lieu of the illustrated control modes.

The interface 600 includes an 'Auto' menu option 610. If a user selects the 'Auto' menu option 610, the user may select or enter a desired heading for an outboard motor autopilot to maintain. The interface 600 also includes a 'Course' menu option 620. If the user selects the 'Course' option 620, the user may select or enter a desired course for an outboard motor autopilot to follow. The interface 600 also includes a 'Switch pilots' menu option 630. The 'Switch pilots' menu option 630 may be selected to deactivate a currently active autopilot, and active another autopilot. For example, after the option 630, is selected, interface 400 in FIG. 4 may be displayed and a user may select an autopilot to activate.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

FIG. 7 illustrates a computer system 700 into which implementations of various technologies and techniques described herein may be implemented. Computing system 700 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 700 may include a central processing unit (CPU) 730, a system memory 726 and a system bus 728 that couples various system components including the system memory 726 to the CPU 730. Although only one CPU 730 is illustrated in FIG. 7, it should be understood that in some implementations the computing system 700 may include more than one CPU 730.

The CPU 730 can include a microprocessor, a microcontroller, a processor, a programmable integrated circuit, or a combination thereof. The CPU 730 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 730 may also include a proprietary processor. The CPU may include a multi-core processor.

The CPU 730 may provide output data to a Graphics Processing Unit (GPU) 731. The GPU 731 may generate graphical user interfaces that present the output data. The GPU 731 may also provide objects, such as menus, in the graphical user interface. A user may provide inputs by interacting with the objects. The GPU 731 may receive the inputs from interaction with the objects and provide the inputs to the CPU 730. In one implementation, the CPU 730 may perform the tasks of the GPU 731. A video adapter 732 may be provided to convert graphical data into signals for a monitor 734. The monitor 734 includes a screen 705. The screen 705 can be sensitive to heat or touching (now collectively referred to as a "touch screen"). In one implementation, the computer system 700 may not include a monitor 734.

The GPU 731 may be a microprocessor specifically designed to manipulate and implement computer graphics. The CPU 730 may offload work to the GPU 731. The GPU 731 may have its own graphics memory, and/or may have access to a portion of the system memory 726. As with the CPU 730, the GPU 731 may include one or more processing units, and each processing unit may include one or more cores.

The system bus 728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 726 may include a read only memory (ROM) 712 and a random access memory (RAM) 716. A basic input/output system (BIOS) 714, containing the basic routines that help transfer information between elements within the computing system 700, such as during start-up, may be stored in the ROM 712. The computing system may be implemented using a printed circuit board containing various components including processing units, data storage memory, and connectors.

Certain implementations may be configured to be connected to a GPS and/or a sonar system. The GPS and/or sonar system may be connected via the network interface 744 or Universal Serial Bus (USB) interface 742. In one implementation, the computing system 700, the monitor 734, the screen 705 and buttons may be integrated into a console.

The computing system 700 may further include a hard disk drive 736 for reading from and writing to a hard disk 750, a memory card reader 752 for reading from and writing to a removable memory card 756 and an optical disk drive 754 for reading from and writing to a removable optical disk 758, such as a CD ROM, DVD ROM or other optical media. The hard disk drive 750, the memory card reader 752 and the optical disk drive 754 may be connected to the system bus 728 by a hard disk drive interface 736, a memory card interface 738 and an optical drive interface 740, respectively. The drives and their associated computer-readable media may provide nonvolatile storage of computer-readable instructions, data structures, program modules and other data for the computing system 700.

Although the computing system 700 is described herein as having a hard disk 750, a removable memory card 756 and a removable optical disk 758, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 700. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 700 may also include a host adapter 733 that connects to a storage device 735 via a small computer system interface (SCSI) bus, a Fiber Channel bus, an eSATA bus, or using any other applicable computer bus interface. The computing system 700 can also be connected to a router 764 to establish a wide area network (WAN) 766 with one or more remote computers 774. The router 764 may be connected to the system bus 728 via a network interface 744. The remote computers 774 can also include hard disks 772 that store application programs 770.

In another implementation, the computing system 700 may also connect to one or more remote computers 774 via local area network (LAN) 776 or the WAN 766. When using a LAN networking environment, the computing system 700 may be connected to the LAN 776 through the network interface or adapter 744. The LAN 776 may be implemented via a wired connection or a wireless connection. The LAN 776 may be implemented using Wi-Fi technology, cellular technology, or any other implementation known to those skilled in the art. The network interface 744 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 774. It will be appreciated that the network connections shown are exemplary and other means of establishing a communications link between the computer systems may be used. The network interface 744 may also include digital cellular networks, Bluetooth, or any other wireless network interface.

A number of program modules may be stored on the hard disk 750, memory card 756, optical disk 758, ROM 712 or RAM 716, including an operating system 718, one or more application programs 720, program data 724 and a database system. The one or more application programs 720 may contain program instructions configured to perform method 300 according to various implementations described herein. The operating system 718 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 700 through input devices such as a keyboard 762 and pointing device. Other input devices may include a microphone, joystick, game pad, satellite dish, scanner, user input button, wearable device, or the like. These and other input devices may be connected to the CPU 730 through a USB interface 742 coupled to system bus 728, but may be connected by other interfaces, such as a parallel port, Bluetooth or a game port. A monitor 705 or other type of display device may also be connected to system bus 728 via an interface, such as a video adapter 732. In addition to the monitor 734, the computing system 700 may further include other peripheral output devices such as speakers and printers.

Marine Electronics Device

FIG. 8 illustrates a schematic diagram of a marine electronics device 800 in accordance with various implementations described herein. The marine electronics device 800 includes a screen 805. In certain implementations, the screen 805 may be sensitive to touching by a finger. In other implementations, the screen 805 may be sensitive to the body heat from the finger, a stylus, or responsive to a mouse. The marine electronics device 800 may be attached to a National Marine Electronics Association (NMEA) bus or network. The marine electronics device 800 may send or receive data to or from another device attached to the NMEA 2000 bus. For example, the marine electronics device 800 may transmit commands and receive data from a motor or a sensor using an NMEA 2000 bus. The marine electronics device 800 may transmit or receive NMEA 2000 compliant messages, messages in a proprietary format that do not interfere with NMEA 2000 compliant messages or devices, or messages in any other format. The device 800 may display marine electronic data 815. The marine electronic data types 815 may include chart data, radar data, sonar data, steering data, dashboard data, navigation data, fishing data, and the like. The marine electronics device 800 may also include a plurality of buttons 820, which may be either physical buttons or virtual buttons, or a combination thereof. The marine electronics device 800 may receive input through a screen 805 sensitive to touch or buttons 820.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It should be understood that a "request" or "can request" can also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer readable medium having stored thereon a plurality of computer-executable instructions which, when executed by a computer, cause the computer to:

display, on a screen of a marine electronics device for a marine vessel, at least two buttons or icons that each correspond to one of a plurality of available autopilots for the marine vessel, wherein the plurality of available autopilots includes at least a first autopilot for a first motor and a second autopilot for a second motor, wherein the first motor is a different type of motor than the second motor, wherein the first motor is a trolling motor, wherein the second motor is not a trolling motor, wherein the marine electronics device is connected to the first autopilot and the second autopilot, wherein the first autopilot is configured to control the first motor to propel the marine vessel at a speed and in a direction, wherein the second autopilot is configured to control the second motor to propel the marine vessel at a speed and in a direction, and wherein the first motor is configured to be operated independently from the second motor such that either the first motor or the second motor is configured to propel the marine vessel at a speed and in a direction, wherein the at least two buttons or icons that each correspond to one of the plurality of available autopilots comprise at least a first button or icon corresponding to the first autopilot and a second button or icon corresponding to the second autopilot;

receive a selection of one of the first button or icon corresponding to the first autopilot or the second button or icon corresponding to the second autopilot;

display one or more buttons or icons that each indicate one of a set of autopilot commands corresponding to the selected one of the plurality of available autopilots, wherein the first autopilot is associated with a first set of autopilot commands for controlling the first autopilot, wherein the second autopilot is associated with a second set of autopilot commands for controlling the second autopilot, wherein the first set of autopilot commands is different than the second set of autopilot commands such that the first set of autopilot commands includes at least one command option that is not available for the second set of autopilot commands;

receive a selection of one of the displayed buttons or icons that each indicate one of a set of autopilot commands; and transmit a message corresponding to the selected one of the set of autopilot commands to the selected one of the plurality of available autopilots to cause the selected one of the plurality of available autopilots to operate according to the selected one of the set of autopilot commands.

2. The non-transitory computer readable medium of claim 1, wherein the selected one of the plurality of available autopilots iS an autopilot for an outboard motor, trolling motor, inboard motor, thruster, jet, or pod.

3. The non-transitory computer readable medium of claim 1, wherein the selected one of the set of autopilot commands comprises a command to navigate to one or more locations, maintain a selected heading, or maintain a selected speed.

4. The non-transitory computer readable medium of claim 1, further comprising computer-executable instructions that cause the computer to calculate a steering movement or motor speed in response to the selected one of a set of autopilot commands.

5. The non-transitory computer readable medium of claim 1, further comprising computer-executable instructions that cause the computer to transmit a message to an autopilot that was not selected in an instance in which the autopilot that was not selected is currently operating to cause the autopilot that was not selected to deactivate.

6. The non-transitory computer readable medium of claim 1, wherein the plurality of available autopilots comprises an outboard motor autopilot and a trolling motor autopilot.

7. A marine electronics device of a marine vessel, the marine electronics device comprising: one or more processors; a screen configured to display marine data; and memory having a plurality of executable instructions which, when executed by the one or more processors, cause the one or more processors to: display, on the screen of the marine electronics device, at least two buttons or icons that each correspond to one of a plurality of available autopilots for the marine vessel, wherein the plurality of available autopilots includes at least a first autopilot for a first motor and a second autopilot for a second motor, wherein the first motor is a different type of motor than the second motor, wherein the first motor is a trolling motor, wherein the second motor is not a trolling motor, wherein the marine electronics device is connected to the first autopilot and the second autopilot, wherein the first autopilot is configured to control the first motor to propel the marine vessel at a speed and in a direction, wherein the second autopilot is configured to control the second motor to propel the marine vessel at a speed and in a direction, and wherein the first motor is configured to be operated independently from the second motor such that either the first motor or the second motor is configured to propel the marine vessel at a speed and in a direction, wherein the at least two buttons or icons that each correspond to one of the plurality of available autopilots comprise at least a first button or icon corresponding to the first autopilot and a second button or icon corresponding to the second autopilot; receive a selection of one of the first button or icon corresponding to the first autopilot or the second button or icon corresponding to the second autopilot; display one or more buttons or icons that each indicate one of a set of autopilot commands corresponding to the selected one of the plurality of available autopilots, wherein the first autopilot is associated with a first set of autopilot commands for controlling the first autopilot, wherein the second autopilot is associated with a second set of autopilot commands for controlling the second autopilot, wherein the first set of autopilot commands is different than the second set of autopilot commands such that the first set of autopilot commands includes at least one command option that is not available for the second set of autopilot commands; receive a selection of one of the displayed buttons or icons that each indicate one of a set of autopilot commands; and transmit a message corresponding to the selected one of the set of autopilot commands to the selected one of the plurality of available autopilots to cause the selected one of the plurality of available autopilots to operate according to the selected one of the set of autopilot commands.

8. The marine electronics device of claim 7, wherein one of the plurality of available autopilots are connected to the marine electronics device by a wired or wireless connection or a network.

9. The marine electronics device of claim 7, wherein the screen is a touchscreen and the selection of one of the plurality of available autopilots is entered by a user selecting one of the buttons or icons using the touchscreen.

10. The marine electronics device of claim 7, wherein the selected one of the plurality of available autopilots is an autopilot for an outboard motor, trolling motor, inboard motor, thruster, jet, or pod.

11. The marine electronics device of claim 7, wherein the executable instructions further cause the processors to transmit a message to an autopilot that was not selected in an instance in which the autopilot that was not selected is currently operating to cause the autopilot that was not selected to deactivate the autopilot that was not selected.

12. The marine electronics device of claim 7, wherein the message comprises a location or locations stored in the memory.

13. The marine electronics device of claim 7, wherein the message comprises a heading or a speed.

14. The marine electronics device of claim 7, wherein the plurality of available autopilots comprises an outboard motor autopilot and a trolling motor autopilot.

15. A method for operating a marine electronics device for a marine vessel, the method comprising: displaying, on a screen of the marine electronics device, at least two buttons or icons that each correspond to one of a plurality of available autopilots for the marine vessel, wherein the plurality of available autopilots includes at least a first autopilot for a first motor and a second autopilot for a second motor, wherein the first motor is a different type of motor than the second motor, wherein the first motor is a trolling motor, wherein the second motor is not a trolling motor, wherein the marine electronics device is connected to the first autopilot and the second autopilot, wherein the first autopilot is configured to control the first motor to propel the marine vessel at a speed and in a direction, wherein the second autopilot is configured to control the second motor to propel the marine vessel at a speed and in a direction, and wherein the first motor is configured to be operated independently from the second motor such that either the first motor or the second motor is configured to propel the marine vessel at a speed and in a direction, wherein the at least two buttons or icons that each correspond to one of the plurality of available autopilots comprise at least a first button or icon corresponding to the first autopilot and a second button or icon corresponding to the second autopilot; receiving a selection of one of the first button or icon corresponding to the first autopilot or the second button or icon corresponding to the second autopilot; displaying one or more buttons or icons that each indicate one of a set of autopilot commands corresponding to the selected one of the plurality of available autopilots, wherein the first autopilot is associated with a first set of autopilot commands for controlling the first autopilot, wherein the second autopilot is associated with a second set of autopilot commands for controlling the second autopilot, wherein the first set of autopilot commands is different than the second set of autopilot commands such that the first set of autopilot commands includes at least one command option that is not available for the second set of autopilot commands; receiving a selection of one of the displayed buttons or icons that each indicate one of a set of autopilot commands; and transmitting a message corresponding to the selected one of the set of autopilot commands to the selected one of the plurality of available autopilots to cause the selected one of the plurality of available autopilots to operate according to the selected one of the set of autopilot commands.

16. The method of claim 15 further comprising transmitting a message to an autopilot that was not selected in an instance in which the autopilot that was not selected is currently operating to cause the autopilot that was not selected to deactivate the autopilot that was not selected.

* * * * *

UNITED STATES PATENT AND TRADEMARK OFFICE
CERTIFICATE OF CORRECTION

PATENT NO. : 10,025,312 B2
APPLICATION NO. : 14/628165
DATED : July 17, 2018
INVENTOR(S) : Robert Langford-Wood Page 1 of 1

It is certified that error appears in the above-identified patent and that said Letters Patent is hereby corrected as shown below:

In the Claims

Claim 2, Column 11, Line 35:
"autopilots iS an autopilot for an outboard motor, trolling"
Should read as the following:
"autopilots is an autopilot for an outboard motor, trolling"

Signed and Sealed this
Eighteenth Day of June, 2019

Andrei Iancu
*Director of the United States Patent and Trademark Office*